(No Model.)
G. B. MOORE, Sr.
LEACHING VAT.
No. 245,006. Patented Aug. 2, 1881.
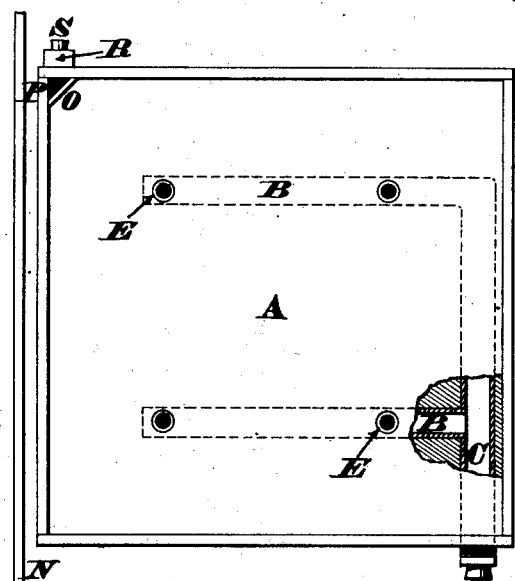
FIG. 1.
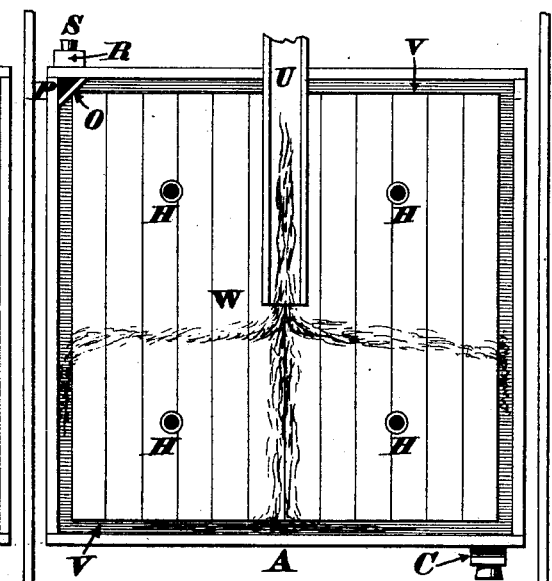
FIG. 2.
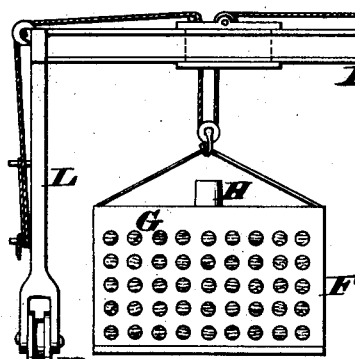
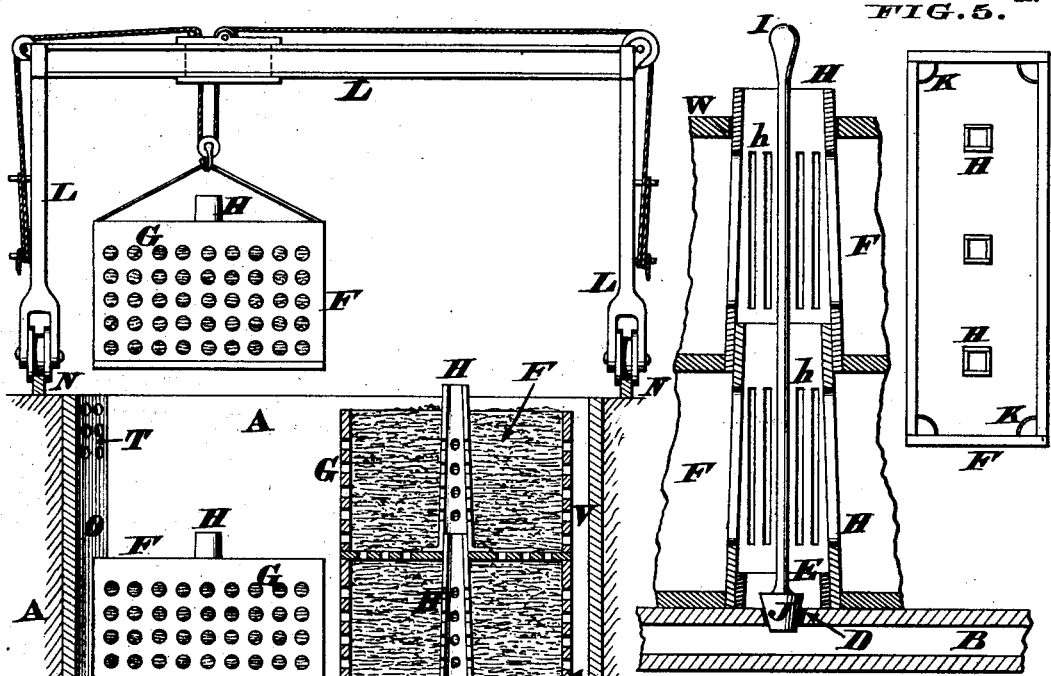
FIG. 3.   FIG. 4.   FIG. 5.
Attest.
John W. Layman,
James Moore.
Inventor.
George B. Moore Sr.
by James F. Layman
Attorney.

UNITED STATES PATENT OFFICE.

GEORGE B. MOORE, SR., OF CINCINNATI, OHIO.

LEACHING-VAT.

SPECIFICATION forming part of Letters Patent No. 245,006, dated August 2, 1881.

Application filed March 29, 1881. (No model.)

*To all whom it may concern:*

Be it known that I, GEORGE B. MOORE, Sr., of Cincinnati, Hamilton county, Ohio, have invented certain new and useful Improvements in Leaching-Vats, of which the following is a specification.

The first part of my invention consists in constructing leaching-vats in such a manner as to permit the spent tan-bark or other soluble substances to be removed in bulk, thereby obviating the necessity of emptying the pit by the slow and laborious act of shoveling, as has heretofore been customary. This result is accomplished by providing the pit with a series of removable boxes or cages to hold the tan-bark or other substance to be leached, said boxes being perforated at the sides and bottom to allow the menstruum to permeate the contents of said receptacles. Furthermore, there project upwardly from the bottom of each box one or more perforated discharge-pipes, which tubes compel the liquor to traverse the entire mass of bark before being drawn off from the pit or vat, said pit being emptied through suitable trunks or channels at or near its bottom, with which trunks said discharge-pipes communicate, the flow from said trunks being controlled by plugs or gates capable of being opened at will. These perforated drain-pipes serve also to locate the boxes in their proper positions in the pit, the pipes of the lower tier of boxes being adapted to enter the pipes of the superincumbent rank of boxes, as hereinafter more fully described.

In the annexed drawings, Figure 1 is a plan of an empty pit or vat embodying my improvements, a portion of the pit-floor being removed to expose the trunks. Fig. 2 is a plan showing a pit filled and covered, and the bark-liquor or other menstruum being run into the same. Fig. 3 is an enlarged vertical section of the pit, taken in the plane of one of the trunks, three of the perforated boxes being shown in position, and another one represented in the act of being lowered with the crane or derrick. Fig. 4 is an enlarged axial section, through the perforated discharge-pipes, of the removable boxes, the plug that closes the inlet of the trunk being shown in position. Fig. 5 is a plan of a modification of the removable boxes.

A represents a pit, vat, or tank, situated either in the ground or above the same, said pit being of any desired shape and capacity. I prefer, however, to make this pit square in horizontal section, and arrange at the bottom of the same one or more trunks or channels, B, for drawing off the heavier liquor. These trunks may be located beneath the pit-floor, as seen in Fig. 1, or above said floor, as represented in Fig. 3, and should communicate with a common outlet or channel, C, closed with a plug, valve, gate, or other cut-off, c. Furthermore, each trunk has one or more inlets D, and as many upwardly-projecting nipples or necks E, for a purpose that will presently appear.

Adapted for convenient insertion in the pit A are boxes or other receptacles, F, capable of holding the tan-bark, or whatever substance is to be leached, and as these boxes are precisely alike a description of one will answer for all of them. They are rectangular, preferably square in horizontal section, open at top, closed at bottom, and pierced with numerous holes G, which perforations are large enough to permit a free circulation through the box of the menstruum, and yet prevent the bark escaping into the pit. Each box has one or more upwardly-projecting perforated drain-pipes, H, open at both ends, and fastened to the bottom of the box, said pipes being tapered in order that the lower ones may telescope into the upper ones, as more clearly seen in Fig. 4. Furthermore, these pipes may be circular in transverse section, as seen in Figs. 2 and 3, or they may be square, as represented in Figs. 4 and 5. Finally, their apertures may be holes, as seen in Fig. 3, or long narrow slots, as represented at $h$ in Fig. 4. Each box has at its corners staples or rings K for engagement of hooks or links depending from a traveling crane or derrick, L, adapted to run on tracks N alongside the pit.

Fitted tightly within the pit is a diagonal partition, O, inclosing a channel, P, at the corner of said pit, the channel having an outlet, R, closed with a plug, S. T are perforations in the upper part of this partition.

As represented in the drawings, the pit A is arranged to receive eight boxes, F, four in each of the horizontal tiers, and yet leave an annular space V around the outer boxes, and sufficient space between the inner receptacles to allow a free circulation of the menstruum. The boxes are filled with the substance to be leached and are lowered into the pit with the crane L, care being taken to have the pipes H of the first tier of boxes fit over the necks or nipples E of the trunks B; consequently said necks serve as guides to indicate the exact position of said boxes within the pit. The upper or second tier of boxes is then lowered directly onto the first ones, the pipes H telescoping within each other, as seen in the sectional portion of Fig. 3, and after this has been accomplished the cover W is placed on the boxes and loaded with weights, if necessary. By referring to Figs. 2 and 4 it will be seen that the upper ends of the pipes H of the second tier of boxes project above this cover W, thereby allowing the handle I to be inserted in these telescoped tubes for the purpose of closing the inlet D with the plug J. Furthermore, these projecting pipes allow steam to be conducted into the pit, in case it should be desired to raise the temperature of the same. These preliminary steps having been taken, the bark-liquor or other menstruum is led into the pit through a hose or trough, U, after first flowing over the cover W, as represented in Fig. 2. As soon as the vat is filled this flow is stopped, and the leaching process is allowed to continue as long as may be desired, any accidental escape of the liquor being prevented while the plugs c, J, and S close their respective channels. The space around each box allows the bark-liquor to permeate the contents of said boxes in the most thorough manner, and at the same time said contents cannot escape into the pit and choke up the trunks B.

When it is desired to empty the vat A plug S is first withdrawn from the channel P R, and the upper and more acid portion of the liquor is drawn off into a suitable receptacle or cistern. The other plugs c and J are now withdrawn and the heavier liquor run off through the trunks B B and channel C into a tank, where it is kept separate from the more acid liquor previously disposed of. As this heavier liquor can escape from the pit only by flowing through the pipes H and trunks B, it is apparent said liquor must permeate the entire mass of tan-bark, and consequently the latter parts with most of its soluble properties. But if the bark is not completely spent at the first operation it may be repeatedly leached, as above described, until it is entirely exhausted, after which act the crane L is run over the pit and each box, with its contents, is lifted out bodily, thus saving the time and labor always involved in shoveling the bark out by hand.

Although I have described my vat as arranged for use in a tannery, yet the invention is not to be limited to this purpose, but may be used for all kinds of leaching operations. Neither do I propose to limit myself to any special number, size, or shape of boxes, but reserve the right of adapting the latter to any peculiar construction of pit or vat—as, for example, a long narrow box with several discharge-pipes H may be used, as seen in Fig. 5; or the boxes F may be omitted and the bark be placed in crates or cages of any material that will not be affected by the menstruum.

I claim as my invention—

1. The combination, in a leaching-vat, of a readily-removable perforated receptacle, F, provided with a perforated or porous drain-pipe, H, adapted to communicate with the outlet of said vat, as and for the purpose described.

2. The combination, in a leaching-vat, of a readily-removable perforated receptacle, F, provided with a perforated or porous drain-pipe, H, adapted to communicate with a discharge-trunk, B, the inlet of which is closed by a plug, J, traversing said pipe H, as herein described.

3. The combination, in a leaching-vat, of a readily-removable perforated receptacle, F, provided with a perforated or porous drain-pipe, H, that engages with the neck E of the discharge-trunk B, as and for the purpose described.

4. The combination, in a leaching-vat, of a series of readily-removable perforated receptacles, F, placed one on top of the other, with their drain-pipes H telescoping in the manner described, the pipes in the lower tier of boxes communicating with the outlet of the pit, as herein described.

5. The combination, in a leaching-vat, of a series of readily-removable perforated receptacles, F, placed one on top of the other, the pipes in the lower tier of boxes communicating with the outlet of the pit and the upper pipes passing through the cover W, as described.

In testimony of which invention I hereunto set my hand.

GEORGE B. MOORE, Sr.

Witnesses:
JAMES H. LAYMAN,
SAML. S. CARPENTER.